United States Patent [19]
Kaplan

[11] Patent Number: 5,555,123
[45] Date of Patent: Sep. 10, 1996

[54] FLYING SPOT SCANNER

[75] Inventor: Martin C. Kaplan, Rochester, N.Y.

[73] Assignee: Eastman Kodak Company, Rochester, N.Y.

[21] Appl. No.: 388,095

[22] Filed: Feb. 14, 1995

[51] Int. Cl.6 .................................................. G02B 26/08
[52] U.S. Cl. ...................... 359/197; 359/216; 359/217; 359/232; 359/233; 250/236; 347/261; 358/302
[58] Field of Search ............................ 359/196–226, 359/227–236, 738–740; 250/234–236, 232–233, 237 R; 347/134, 230–231, 241–243, 256–261; 358/296–302, 474–496

[56] References Cited

U.S. PATENT DOCUMENTS 2,064,475  12/1936  Ives .
3,970,359  7/1976  Starkweather ............................... 350/7
4,040,095  8/1977  Abrams ..................................... 359/235
4,578,688  3/1986  Okuno ....................................... 347/134
4,739,416  4/1988  Manian ..................................... 347/241
4,828,384  5/1989  Plankenhorn et al. ................... 356/121
4,861,983  8/1989  Sasada et al. ............................ 250/235
5,101,295  3/1992  Lichtman et al. ....................... 359/368

Primary Examiner—James Phan
Attorney, Agent, or Firm—Thomas H. Close

[57] ABSTRACT

A moving mask is incorporated in a flying spot scanner to reduce flare. The mask obscures all portions of the object being scanned, except for a small region surrounding the point currently being scanned. The mask moves to maintain registration with the flying spot. A rotating slotted disk with curved slots in cooperation with a fixed mask having a slot is described as one mechanism for achieving such masking.

7 Claims, 4 Drawing Sheets ions/sec, h=44.2 mm. Other parameters yield
FLYING SPOT SCANNER

FIELD OF THE INVENTION

The invention relates generally to flying spot scanners, and in particular to improvements in such scanners for reducing flare.

BACKGROUND OF THE INVENTION

Flying spot scanners are used to convert images on film, documents, etc. to digital image representations (input scanner), and vice versa (output scanner). An input flying spot scanner ideally images one location (one pixel) of the image at a time. However, imperfections in the device generally cause some erroneous contributions to the signal not related to the pixel being imaged, such as flare. Output flying spot scanners suffer similar flare imperfections, in which exposure intended for one pixel unintentionally causes some exposure to other pixels.

A typical input flying spot scanner 10, for scanning a sheet of medium 12 such as film, is shown in FIG. 8. A collimated beam 14 from a laser 15 deflects off a rotating polygonal mirror 16, scanning across a stripe portion of the film. The beam intensity is modulated by the image on the film, and then enters an integrating cavity 18 through an entry slot 19, where the light reflects from the internal walls of the cavity 18 one or more times until it exits the cavity through a port 20 in the end of the integrating cavity 18, and enters an optical detector 22, such as a photodiode or photomultiplier tube that produces an output signal on cable 23. Beam shaping optics including a scanning lens 24 and an f-theta lens 26 focus the beam and linearize the scan velocity along the line. The beam 14 traverses a straight line across the film, and the f-theta lens 26 modifies the motion of the beam so that its position across the film varies linearly with time during each scan line. The film 12 is moved perpendicular to the plane of the drawing, so that the deflected laser beam 14 traverses the film in a series of closely spaced scan lines, i.e. the laser beam 14 traverses an entire film frame in a raster pattern. There are many other flying spot scanner designs in use, including variations on this polygon deflected laser design, and very different designs such as CRT (cathode ray tube) scanners, but flying spot scanners generally traverse the film in a raster pattern, imaging one pixel at a time.

SUMMARY OF THE INVENTION

The present invention is directed to overcoming one or more of the problems set forth above. Briefly summarized, according to one aspect of the present invention, a moving mask is incorporated in a flying spot scanner to reduce flare. The mask obscures all portions of the object being scanned, except for a small region surrounding the point currently being scanned. The mask moves to maintain registration with the flying spot. A rotating slotted disk with curved slots in cooperation with a fixed mask is described as one mechanism for achieving such masking.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 8:
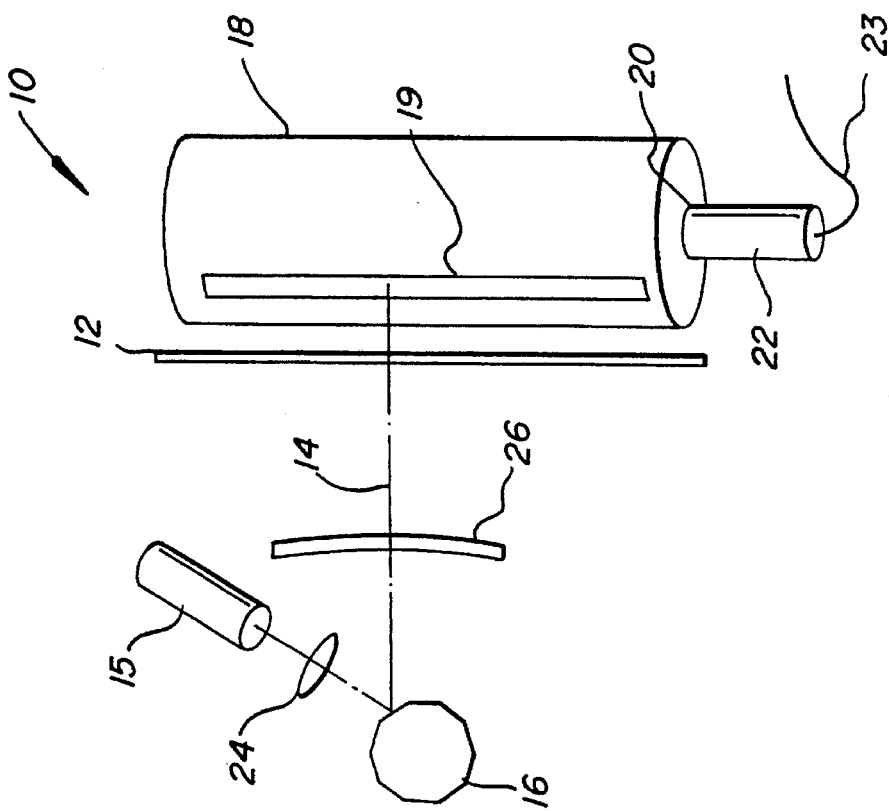
FIG. 8 is a schematic diagram of a prior art flying spot scanner for scanning film.
Figure 1:
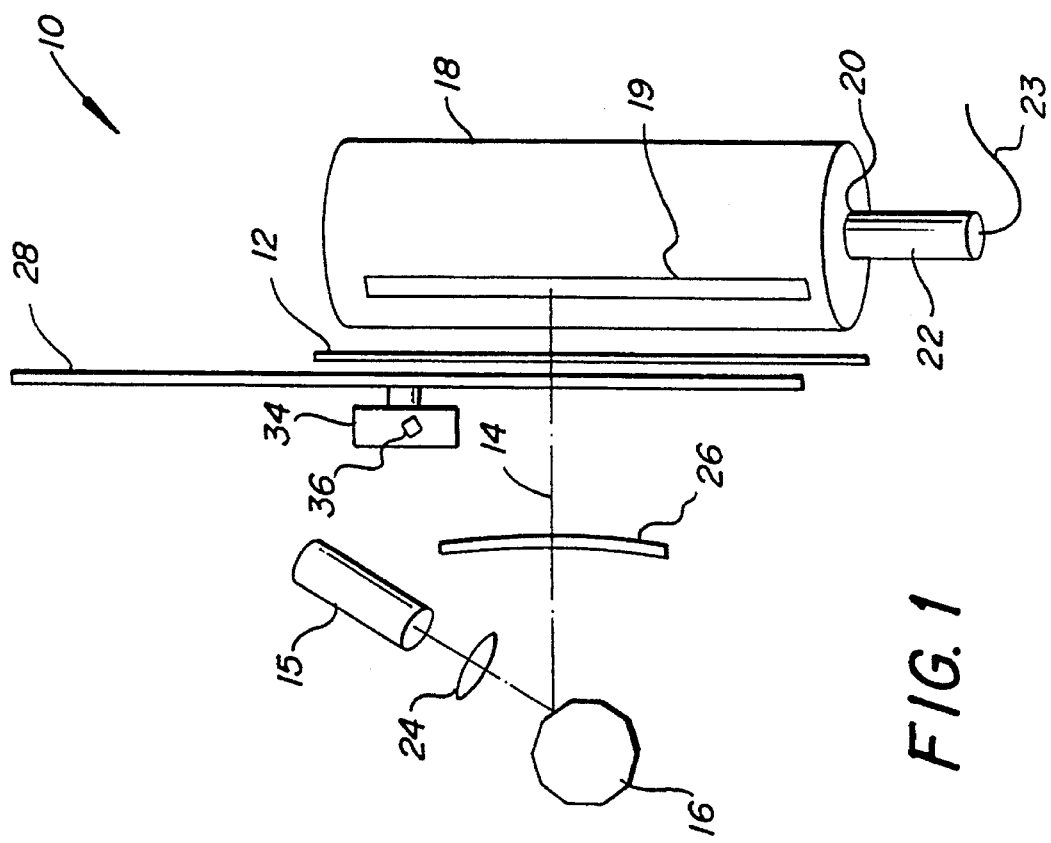
FIG. 1 is a schematic diagram of a flying spot scanner having a moving mask for reducing flare according to the present invention.
Figure 2:
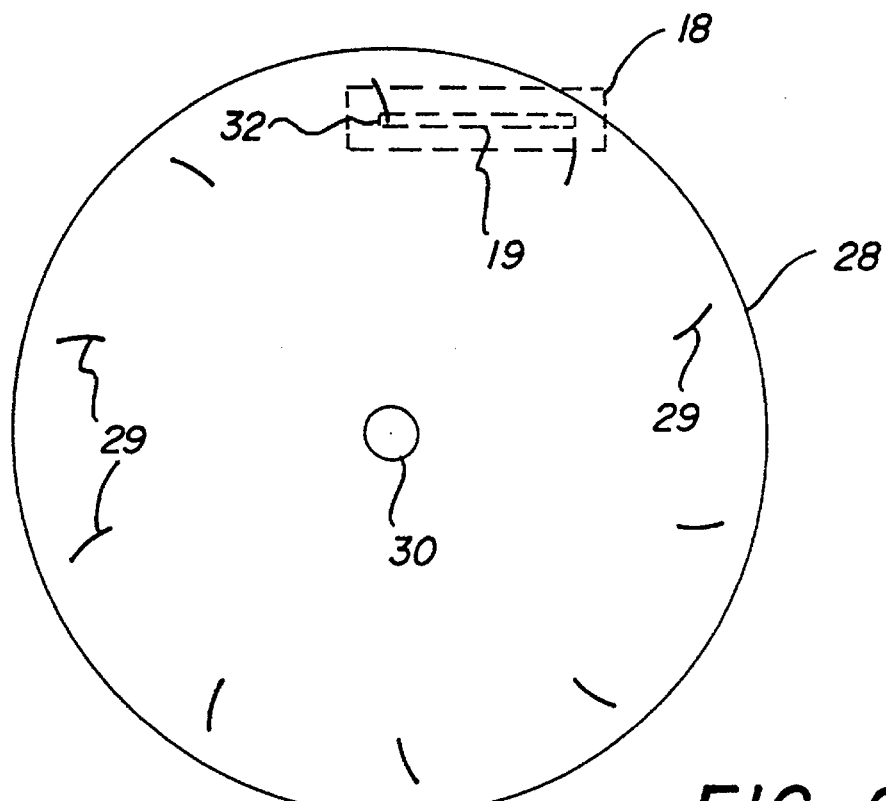
FIG. 2 is a is a front view of the moving mask disc shown in FIG. 1.

FIGS. 1 and 2 show a modified flying spot scanner 10, in the preferred embodiment, incorporating a disk 28 having slots 29 adjacent to the film medium 12. A detailed view of the disk 28 is shown in FIG. 2. A pivot 30 at the center of the disk 28 is centered directly below the leading end 32 of the integrating cavity entry slot 19. In the present example, the integrating cavity entry slot 19 is 25 mm long and 2 mm wide, which is appropriate for scanning 35 mm photographic film. The film 12 is oriented with the 35 mm width across the 25 mm wide slot, with the long dimension of the film strip (not shown) vertical in FIG. 2. Normally, only the center 25 mm of the 35 mm width of film contains an image (the remaining 10 mm is dedicated to perforations and edge printing), so the cavity slot 19 spans the entire image on the film. The disk 28 is driven by a motor 34 (see FIG. 1) to rotate clockwise, 100 rotations per second. The polygonal mirror 16 deflects the laser beam 14 so that it scans across the film 12 at a rate of 25 mm per 0.9 ms (milliseconds), and begins a new scan line every 1.0 ms. The distance from the center of the disk to the inner end of each slot 29 is 44.2 mm. The center of the disk 28 is 44.2 mm below the leading end 32 of the integrating cavity entry slot 19.

Figure 3:
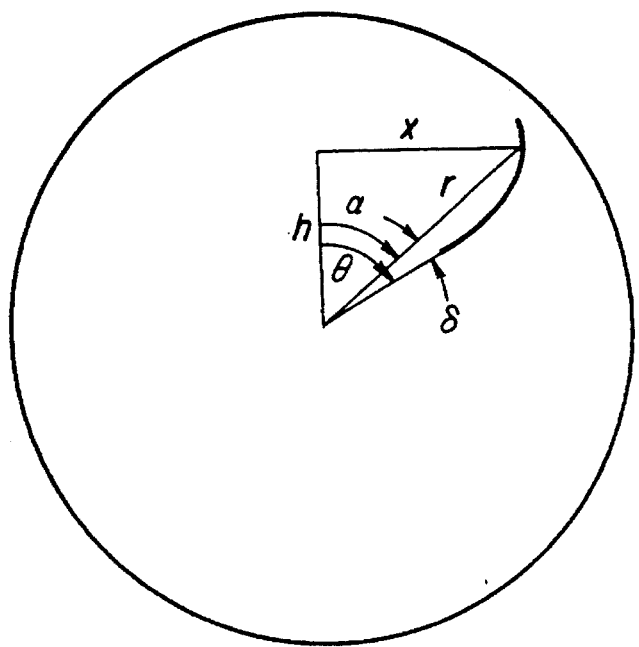
FIG. 3 is a diagram illustrating how the shape of the slots in the moving mask disk of FIG. 2 is calculated.
Figure 4:
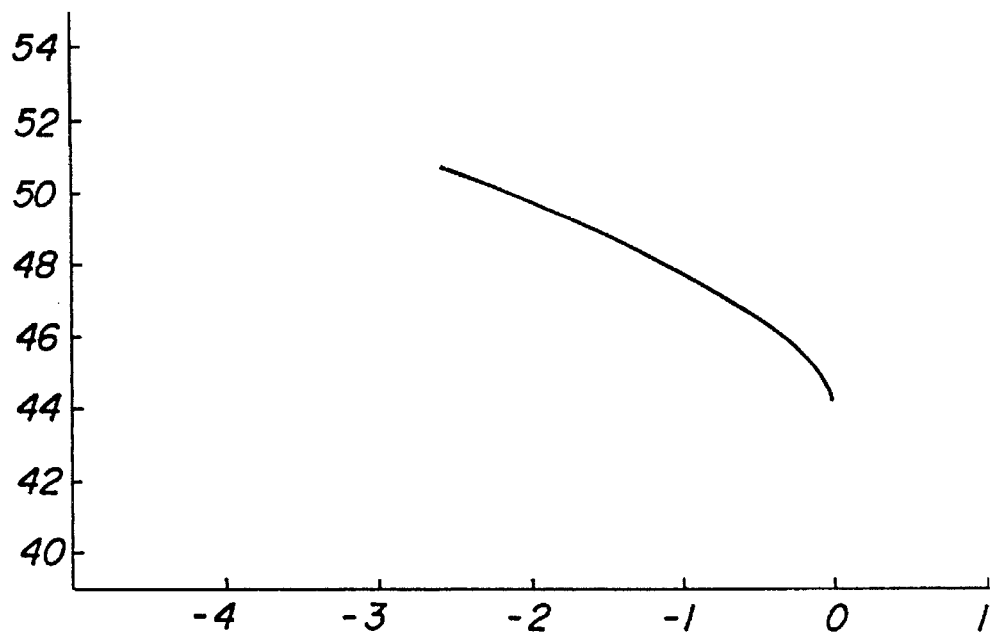
FIG. 4 is a graph showing the shape of the slot in the disk in a preferred embodiment of the invention.
Figure 5:
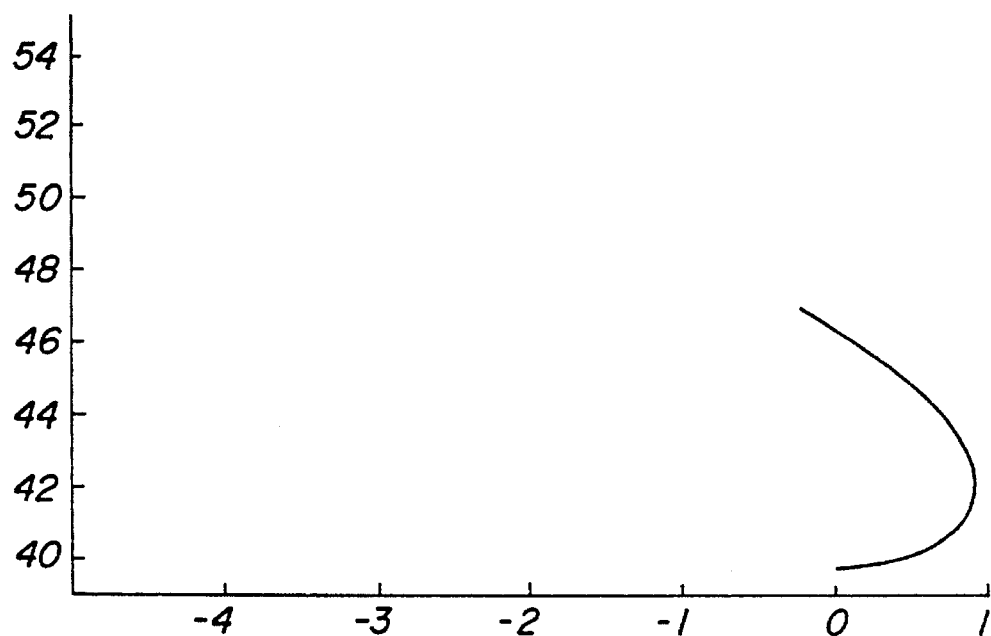
FIG. 5 is graph showing the shape of the slot in the mask disk in an alternative embodiment of the invention.
Figure 6:
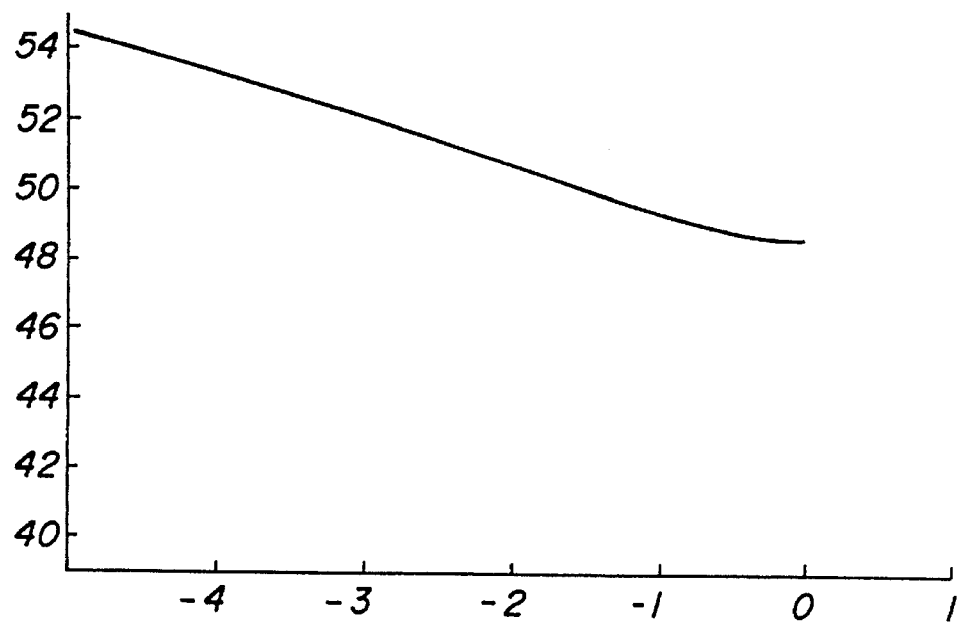
FIG. 6 is graph showing the shape of the slot in the mask disk in a further alternative embodiment of the invention.
Figure 7:
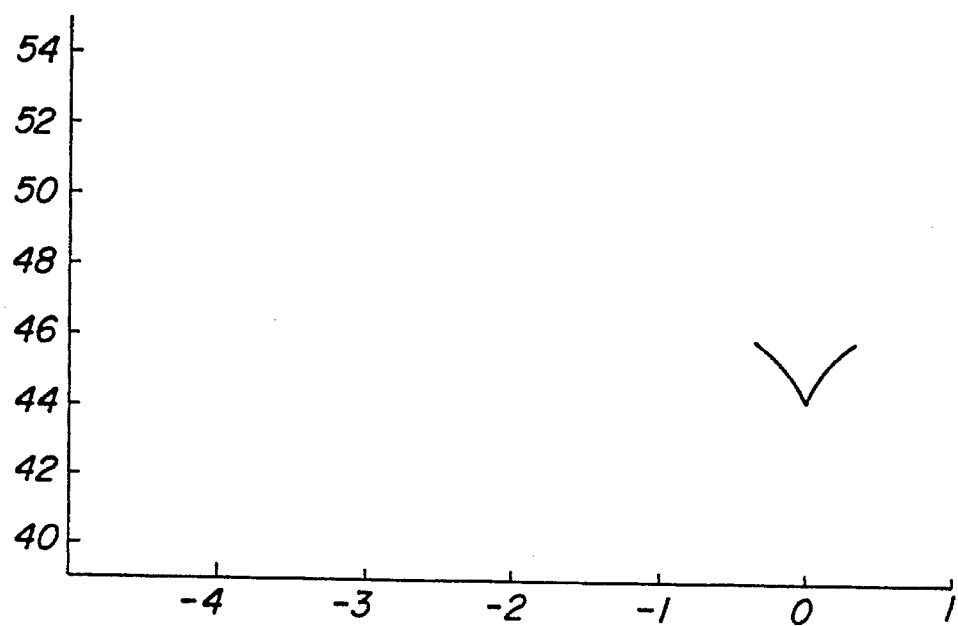
FIG. 7 is graph showing the shape of the slot in the mask disk in a still further alternative embodiment of the invention.

The shape of each disk slot 29 is identical, and is governed by the following equations:

$$x = st \qquad (1)$$

$$\theta = \omega t$$

$$\tan \alpha = \frac{x}{h}$$

$$\delta = \alpha - \theta$$

$$r = \sqrt{h^2 + x^2}$$

where the variables (see FIG. 3) are as follows: t is the time since the start of the scan line, s is the linear speed of the flying spot along the scan line, x is the position of the flying spot along the scan line, ω is the angular velocity of the disk, α is the angular position of the flying spot, θ is the angular rotation of the disk, h is the distance from the center of the disk to the scan line (entry slot of cavity). The polar coordinates (r, δ) give the shape of the slot, parametrically in t. These equations specify a general slot shape, and give the shape for the preferred embodiment when the above specified parameters are used, namely s=25 mm/0.9 ms, ω=100 rotations/sec, h=44.2 mm. Other parameters yield other embodiments. FIG. 4 shows an enlarged view of one of the slots of the preferred embodiment. FIG. 5 shows the shape of the slot for an alternative embodiment. This design is the same as the preferred embodiment, except that the disk diameter is reduced by setting h=39.8 mm. FIG. 6 shows the shape of the slot for another alternative embodiment. This design is the same as the preferred embodiment, except that the disk diameter is increased by setting h=48.6 mm. FIG. 7 shows the shape of the slot for yet another alternative embodiment. This design is the same as the preferred embodiment, except that the center of the disk has been moved from below the leading end of the entry slot 19 to a new location below the center of the entry slot 19. This embodiment has a mask that actually uncovers two small areas, one at the position of the flying spot, and a second at another, unused position. These alternative embodiments show how dramatically the slot shape is affected by varying some parameters. Obviously, for other applications still other choices for the parameters will be appropriate.

A sync detector 36 (see FIG. 1) is included in the preferred embodiment. This optical detector generates an electrical pulse when the flying spot passes the location of the sync detector, at the start of the scan line. This provides a reliable electronic timing signal for synchronizing the moving mask disk 28. A synchronous motor 34 drives the disk 28, synchronized to the signal from the sync detector 36. Other motor drives are also possible, such as geared drives, DC motors with encoders, stepper motors, etc. Other synchronizing methods may be used, other locations for the optical sync detector, or eliminating the optical sync detector and instead using mechanical sync detectors on the polygon mirror, encoders on the polygon mirror, or a synchronous motor drive on the polygon mirror.

In the preferred embodiment, the image on the film is masked by both the rotating, slotted disk 28 and by the cavity entry slot 19. Only the portion of the film between the intersection of a disk slot 29 and the cavity slot 19 is optically uncovered. This general design, intersecting a stationary linear slot mask with a rotating slotted disk mask, also is appropriate to other flying spot scanner devices. In some devices, the film will be stationary and the linear slot will move, or both will move. This general design, a slot and a slotted disk, may also be used with flying spot scanner output devices. In devices where the flying spot does not trace a straight line, then the linear slot will be replaced by a curved slot, and the shape of the disk slots will also be modified accordingly. In devices where the flying spot position is not linear in time (e.g. the f-theta lens is eliminated), the shape of the disk slots will be modified accordingly.

Dynamic masking may also be achieved by using moving masks other than rotating, slotted disks combined with a linear slots.

The invention has been described with reference to a preferred embodiment. However, it will be appreciated that variations and modifications can be effected by a person of ordinary skill in the art without departing from the scope of the invention.

PARTS LIST 10 flying spot scanner
12 medium
14 laser beam
15 laser
16 polygonal mirror
18 integrating cavity
19 entry slot
20 port in integrating cavity
22 detector
23 cable
24 scanning lens
26 F-theta lens
28 slotted disk
29 disk slots
30 pivot
32 leading end of entry slot
34 motor
36 sync detector

I claim:

1. An improved flying spot scanner of the type having means for deflecting and forming a moving spot of light wherein the improvement comprises: mask means for forming a moving aperture that moves in synchronism with the spot of light for reducing flare in the scanner.

2. A flying spot scanner, comprising:
   a. means for forming a beam of light;
   b. deflecting means for deflecting the beam of light along a line;
   c. media transport means for transporting a sheet medium in a direction orthogonal to the line; and
   d. mask means for forming a moving aperture that moves in synchronism with the beam of light.

3. The flying spot scanner claimed in claim 2, wherein the scanner is an input scanner including a light detector having an integrating cavity with a linear slot for admitting the beam of light into the cavity, and the mask means including a rotating disk having a radial slot that cooperates with the linear slot in the integrating cavity to form the moving aperture when the disk is rotated.

4. The flying spot scanner claimed in claim 3, wherein the linear slot in the integrating cavity lies along a straight line.

5. The flying spot scanner claimed in claim 2, wherein the scanner is an output scanner and wherein the mask means includes a plate having a linear slot arranged to pass the beam of light to a sheet of photosensitive media and a rotating disk having a radial slot that cooperates with the linear slot in the plate to form the moving aperture when the disk is rotated.

6. The flying spot scanner claimed in claim 5, wherein the linear slot in the plate lies along a straight line.

7. The flying spot scanner claimed in claim 3 or 5, wherein the radial slot in the disk is defined by the following equations:

$$x = st$$

$$\theta = \omega t$$

$$\tan \alpha = \frac{x}{h}$$

$$\delta = \alpha - \theta$$

$$r = \sqrt{h^2 + x^2} \quad ,$$

where x is the position of the flying spot along the scan line, s is the linear speed of the flying spot along the scan line, t is time since the start of the scan line, $\theta$ is the angular rotation of the disk, $\omega$ is the angular velocity of the disk, $\alpha$ is the angular position of the flying spot, h is the distance from the center of the disk to the scan line, $\delta$ is the difference between $\alpha$ and $\theta$, r is the radial distance from the center of the disk to the flying spot, and wherein the polar coordinates (r, $\delta$) give the shape of the radial slot, parametrically in t.

* * * * *